(No Model.) 2 Sheets—Sheet 1.

R. W. HUSS.
PNEUMATIC TIRE.

No. 502,002. Patented July 25, 1893.

Witnesses
West Middleton
Reta M. Wagner

Inventor
Rudolph W. Huss
By Chas. G. Page
Atty (No Model.) 2 Sheets—Sheet 2.

R. W. HUSS.
PNEUMATIC TIRE.

No. 502,002. Patented July 25, 1893.

Witnesses
West Middleton
Rela M. Wagner

Inventor
Rudolph W. Huss
By Chas. G. Page
Atty

UNITED STATES PATENT OFFICE.

RUDOLPH W. HUSS, OF CHICAGO, ILLINOIS, ASSIGNOR TO CHARLES G. PAGE, TRUSTEE, OF SAME PLACE.

PNEUMATIC TIRE.

SPECIFICATION forming part of Letters Patent No. 502,002, dated July 25, 1893.

Application filed November 18, 1892. Serial No. 452,452. (No model.)

*To all whom it may concern:*

Be it known that I, RUDOLPH W. HUSS, a citizen of the United States, residing at Chicago, in the county of Cook, in the State of Illinois, have invented a certain new and useful Improvement in Pneumatic Tires, of which the following is a specification.

In a pneumatic tire characterized by my invention I reinforce the elastic tread thereof by cross threads which prevent transverse stretch or expansion, and longitudinal threads capable of elastic stretch or longitudinal yield, thereby allowing the elastic tread to have a longitudinal elastic stretch or yield in running over obstructions, and in this way increasing the resiliency and life or activity of the tire. At the same time, the longitudinal threads cause or permit the transverse threads to normally maintain proper relative positions, and also keep them in proper relationship during the process of applying a fabric thus formed to the tire. As a matter of further improvement, I make the longitudinal threads for the tread of material capable of elastic yield or stretch, but provide the sides of the tire with threads, which will have no practical yield or stretch, such for example as with stout threads of linen or like material, which arrangement permits the tire when inflated, to take a firm hold or seat upon the wheel rim. As a further improvement I provide the tire with longitudinally arranged reinforcing threads which decrease in size toward the tread, thereby more heavily reinforcing the sides of the tire and lightly reinforcing the tread thereof, so far as the longitudinal threads are concerned. With such arrangement, broadly considered, the finer threads along the tread may or may not be capable of elastic stretch, but desirably they are of some material having such elasticity.

Figure 1:
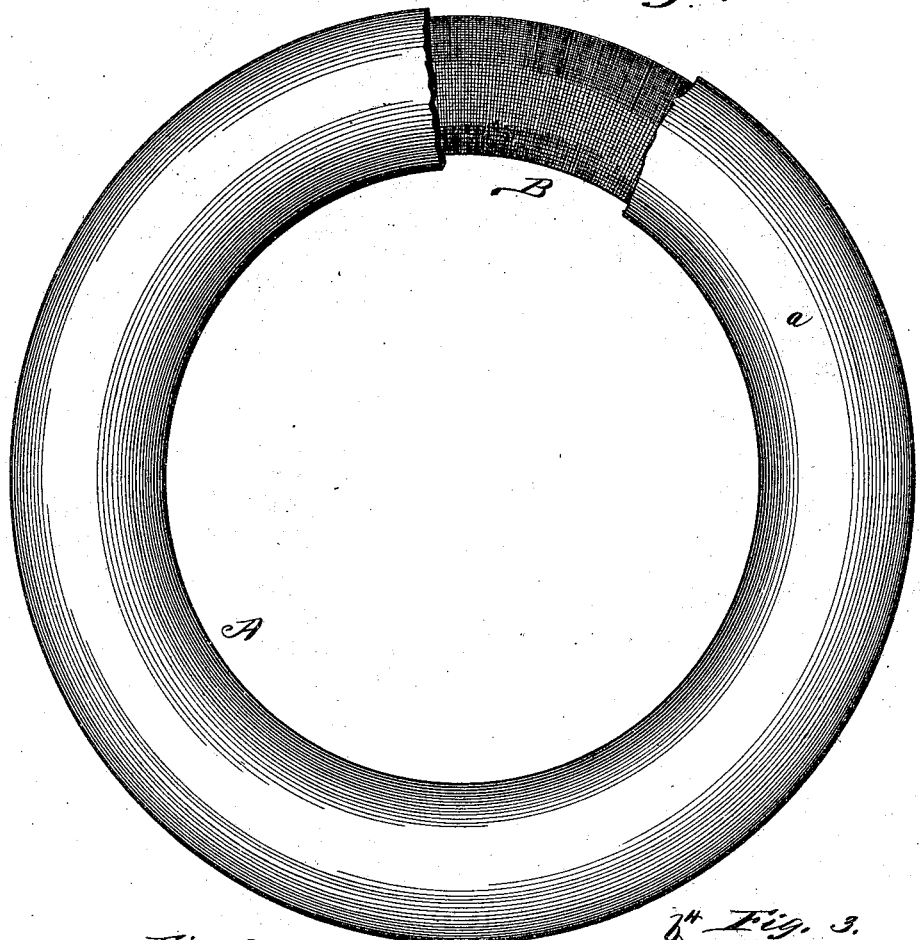
Figure 2:
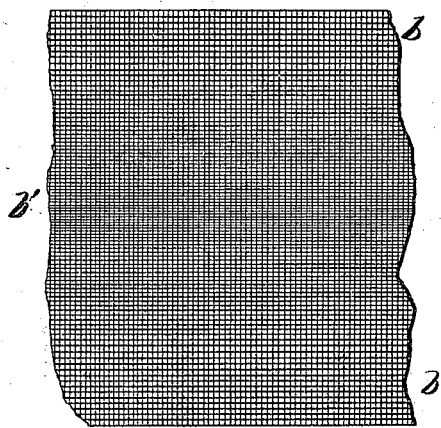
Figure 3:
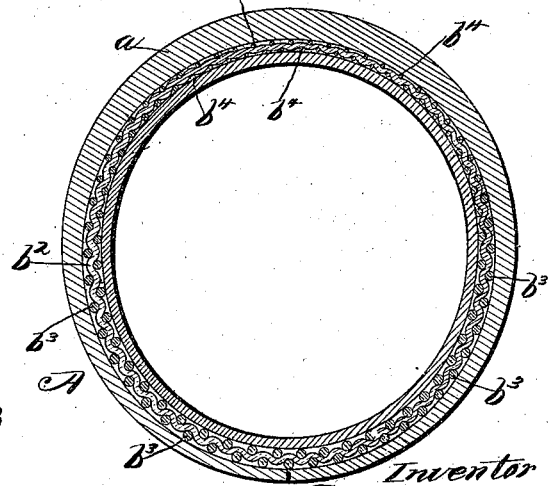
Figure 4:
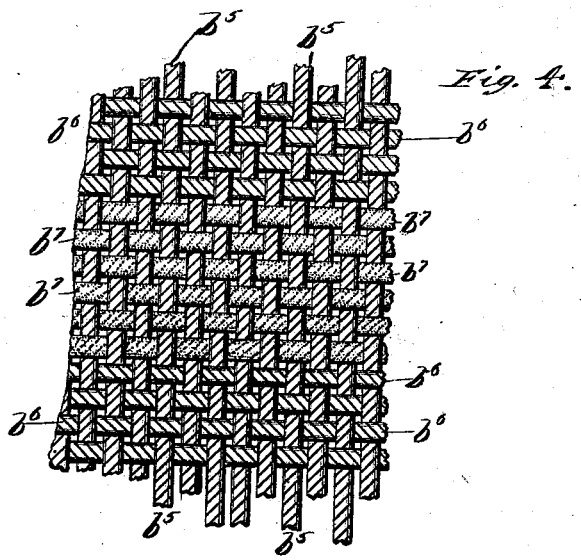
Figure 5:
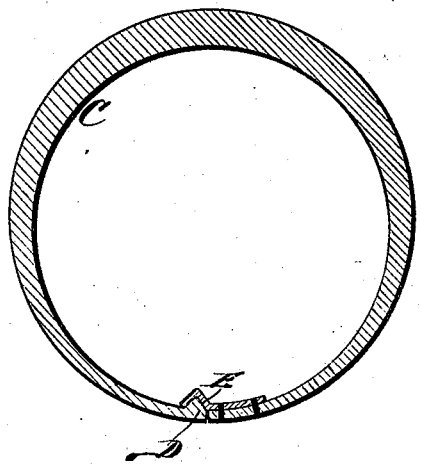
Figure 6:

In the accompanying drawings,—Figure 1 represents in elevation a pneumatic tire with a portion of the elastic sheath or cover broken away so as to expose the reinforcing threads, it being observed that for convenience of illustration the tire is made considerably out of true proportion. Fig. 2 shows on a larger scale a portion of a tube of fabric adapted for a pneumatic tire and having its longitudinal threads made to decrease in size toward the tread. Fig. 3 further illustrates my invention by a transverse section through a portion of the tire. Fig. 4 illustrates on an exaggerated scale a portion of the fabric having warp and woof threads of the same size, but with certain of the warp threads of different material from the others and understood to be capable of elastic yield or stretch. Fig. 5 is a cross section through the sheath having a fastening. Fig. 6 shows the fastening device in perspective.

In Fig. 1 the tire A has an elastic sheath $a$, which is reinforced by a fabric B, transversely arranged threads or thread portions and by longitudinally arranged threads which diminish in size from the sides toward the tread of the tire so as to reinforce the tread by comparatively light threads. As a special and preferred arrangement, these light threads are made of some material which will permit them to have an elastic stretch or yield, and preferably the stouter threads at the side are made of some material which will not stretch. The elastic threads may for example be woolen which in contradistinction to linen thread possesses a considerable degree of elastic stretch or yield.

In Fig. 2 the fabric B comprises portions $b$ of stout longitudinal threads, and a longitudinal portion $b'$ of threads which decrease in size toward the middle line of what is understood to be the tread portion of the fabric, since it is to reinforce the tread portion of the tire. The cross threads may and desirably are of material which will not stretch to any appreciable extent.

In Fig. 3, $b^2$ indicates a portion of the cross thread, in conjunction with stout longitudinal threads $b^3$ and smaller longitudinal threads $b^4$ which decrease in size toward the middle line of the tread.

In Fig. 4, the cross or woof threads $b^5$ of any ordinary or suitable material, are interwoven with longitudinal threads $b^6$ which are not adapted to stretch, and with longitudinal threads $b^7$ which are adapted to have a longitudinal elastic yield or stretch. The threads $b^6$ may for example be of linen or like material, while the threads $b^7$ can be woolen threads, or threads of any other known elastic material or materials, and in fact, for the purpose of preserving the relative position of the cross threads, and yet allowing the thread to stretch, these longitudinal or warp threads $b^7$ can be of rubber or like elastic material or composition, it being understood that these elastic threads are to lie along the tread portion of the tire, and that while forming in conjunction with the woof threads a fabric, they will serve to provide a reinforcing fabric portion which will have an elastic longitudinal stretch, but not an elastic transverse stretch.

The fabric involved in the foregoing matters can be woven in tube or sheet form, and the tube can be used either with or without splitting, according to the character of the tire.

My invention can be applied to or incorporated within any known or desired construction of pneumatic tire, and can be applied to either the sheath or air tube or both as may be preferred.

In Fig. 5 the split sheath C has along one edge of its opening or line of division, a rib D and along the opposite edge thereof a plate E which is hook-shaped in cross section so as to engage with the rib and thereby lock the sheath in a closed condition. This plate is also shown in Fig. 6. Where the sheath is split continuously, I can use any desired number of these locking plates or make them in sections, or for a short split I can employ but one. The plate and rib form an exceedingly simple fastening, and do away with all necessity for a special rim for the tire. By such arrangement the sheath can be readily fastened along its line of split, and when deflated, can be readily unfastened and opened.

What I claim as my invention is—

1. A pneumatic tire provided along its tread with longitudinally arranged threads capable of elastic longitudinal yield, substantially as described.

2. A pneumatic tire having its tread reinforced by cross-threads in conjunction with longitudinal threads capable of longitudinal elastic yield, substantially as described.

3. A pneumatic tire having its tread reinforced by cross-threads which prevent its transverse stretch, and by longitudinal threads which permit it to have a longitudinal elastic stretch, substantially as described.

4. A pneumatic tire involving a reinforcing fabric having warp threads adapted for longitudinal yield and arranged along the tread of the tire, substantially as described.

5. A pneumatic tire having a reinforcing fabric formed with warp or longitudinal threads which run along the tread portion of the tire and which are capable of longitudinal elastic stretch, and with warp threads running along the sides of the tire and not adapted for longitudinal stretch, substantially as described.

6. A pneumatic tire having a reinforcing fabric having warp threads along the tread of the tire made smaller than the warp threads along the sides thereof, substantially as described.

7. A pneumatic tire having a reinforcing fabric formed with warp threads which decrease in size toward the tread portion of the tire, substantially as described.

RUDOLPH W. HUSS.

Witnesses:
CHAS. G. PAGE,
W. D. MIDDLETON.